(12) United States Patent
Katsuta

(10) Patent No.: US 6,842,666 B2
(45) Date of Patent: Jan. 11, 2005

(54) ROBOT SYSTEM

(75) Inventor: Takashi Katsuta, Himeji (JP)

(73) Assignee: Nitta Corporation, Osaka (JP)

( * ) Notice: Subject to any disclaimer, the term of this patent is extended or adjusted under 35 U.S.C. 154(b) by 127 days.

(21) Appl. No.: 10/388,321

(22) Filed: Mar. 13, 2003

(65) Prior Publication Data

US 2004/0181311 A1 Sep. 16, 2004

(51) Int. Cl.[7] .................................................. G06F 19/00
(52) U.S. Cl. .................................................. 700/245
(58) Field of Search ............................... 700/245, 218, 700/259, 214–215; 318/568.16; 29/430, 407.09; 414/273, 277, 789.6; 369/30.4, 34.01; 360/92; 422/134

(56) References Cited

U.S. PATENT DOCUMENTS

| | | | |
|---|---|---|---|
| 5,372,567 A | * 12/1994 | Whittington et al. | 483/29 |
| 5,636,425 A | * 6/1997 | Best | 29/407.04 |
| 6,142,722 A | * 11/2000 | Genov et al. | 414/217 |
| 6,144,519 A | * 11/2000 | Hanaoka et al. | 360/92 |
| 6,215,315 B1 | * 4/2001 | Maejima | 324/539 |
| 6,219,313 B1 | * 4/2001 | Ries et al. | 369/30.31 |
| 6,404,849 B1 | * 6/2002 | Olson et al. | 378/79 |

* cited by examiner

*Primary Examiner*—Thomas G. Black
*Assistant Examiner*—McDieunel Marc
(74) *Attorney, Agent, or Firm*—Darby & Darby

(57) ABSTRACT

A robot system, in which various pieces of information are exchanged between a tool on a wrist of a robot and a control panel by wireless communication, includes plural storage cells for supplying the tool with power, plural chargers for charging the plural storage cells. An automatic change mechanism is provided on each of the plural storage cells and transfers an associated storage cell from the tool to one of the chargers and vice versa. When the storage cell being placed on the tool runs out of power, the storage cell is returned to a vacant charger to be charged, while another storage cell which has been charged is received on the tool.

2 Claims, 5 Drawing Sheets

ROBOT SYSTEM

TECHNICAL FIELD OF THE INVENTION

The present invention relates to a robot system.

DESCRIPTION OF THE RELATED PRIOR ART

In a conventional robot system, cables (such as a signal cable) from a robot control panel or the like run inside and/or outside the robot in order to verify signals of a sensor or to power an actuator provided on a tool attached on a wrist of an industrial robot.

Consequently, the conventional robot system has a drawback that the presence of cables restricts the movement of the robot or that the cables sometimes break to bring the production and/or operation line to a stop.

Hence, in the industries where robot systems have been introduced, there has been a demand for development of a robot system In which the movement range of a robot is less restricted and a halt in the production and/or operation line would hardly occur.

OBJECT AND THE SUMMARY OF THE INVENTION

It is hence an object of the present invention to provide a robot system in which a range of movement of a robot is less restricted and a stop of production and/or operation line is less likely to happen.

In order to achieve the above object, the robot system according to the present invention, in which various pieces of information are exchanged between a tool on a wrist of a robot and a control panel by wireless communication, has the following features. The robot system includes plural storage cells for supplying the tool with power including information communication; plural chargers for charging the plural storage cells; and an automatic switch mechanism provided on each of the plural storage cells which changes the connection of the associated storage cell from the tool to the charger and vice versa. When one of the storage cells being placed on the tool runs out of power, this storage cell Is returned to a vacant charger out of the plural chargers to be charged, and another of the storage cells having been charged on one of the plural chargers is received on the tool.

In the robot system of the present invention, when being on the tool side, the storage cells are electrically connected with a power wiring, while when being on the charger side, the storage cells are electrically connected with a charge wiring.

The above and other objects, features and advantages of the present invention will become apparent from the following description in conjunction with the accompanying drawings.

DETAILED DESCRIPTION OF THE INVENTION

Figure 1:
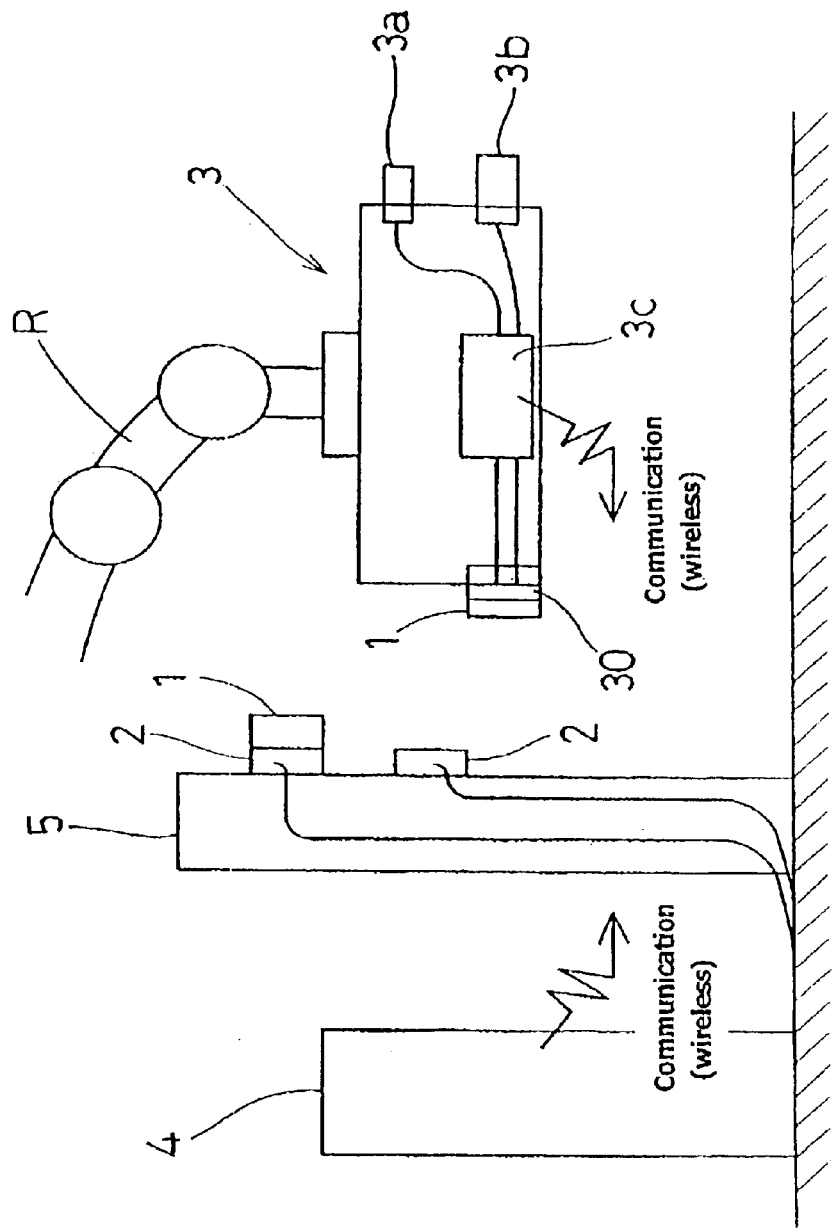
FIG. 1 is a conceptual view of a robot system according to a first embodiment of the present invention.

A robot system of a first embodiment of the present Invention is conceptually illustrated in FIG. 1.

The basic structure of the robot system will be described below. As shown in FIG. 1, in the robot system, various pieces of information are exchanged between a tool 3 attached on a wrist of a robot R and a control panel 4 by wireless communication. The robot system of this embodiment includes two storage cells 1 and two chargers 2. The storage cells 1 function as a power supply for the tool 3 side and the chargers 2 charge the storage cells 1. Each of the storage cells 1 is provided with an automatic switch mechanism 1a which changes the connection of the storage cell 1 from a tool 3 side to a charger 2 side or vice versa. With the function of the automatic switch mechanism 1a, when one of the storage cells (a first storage cell) 1 attached on the tool 3 is running out of power, the first storage cell 1 is returned to a vacant charger out of the chargers (a first charger) 2 to be charged, and the other storage cell (a second storage cell) 1 which has been charged on the other charger (a second charger) 2 is received on the tool 3 side from the second charger 2. In this embodiment, while the robot system is in operation, both of the chargers 2 and one of the storage cells 1 are attached on a charge panel 5, and the other storage cell 1 is attached on the tool 3.

Respective parts of the robot system are constructed as follows.

Figure 2:
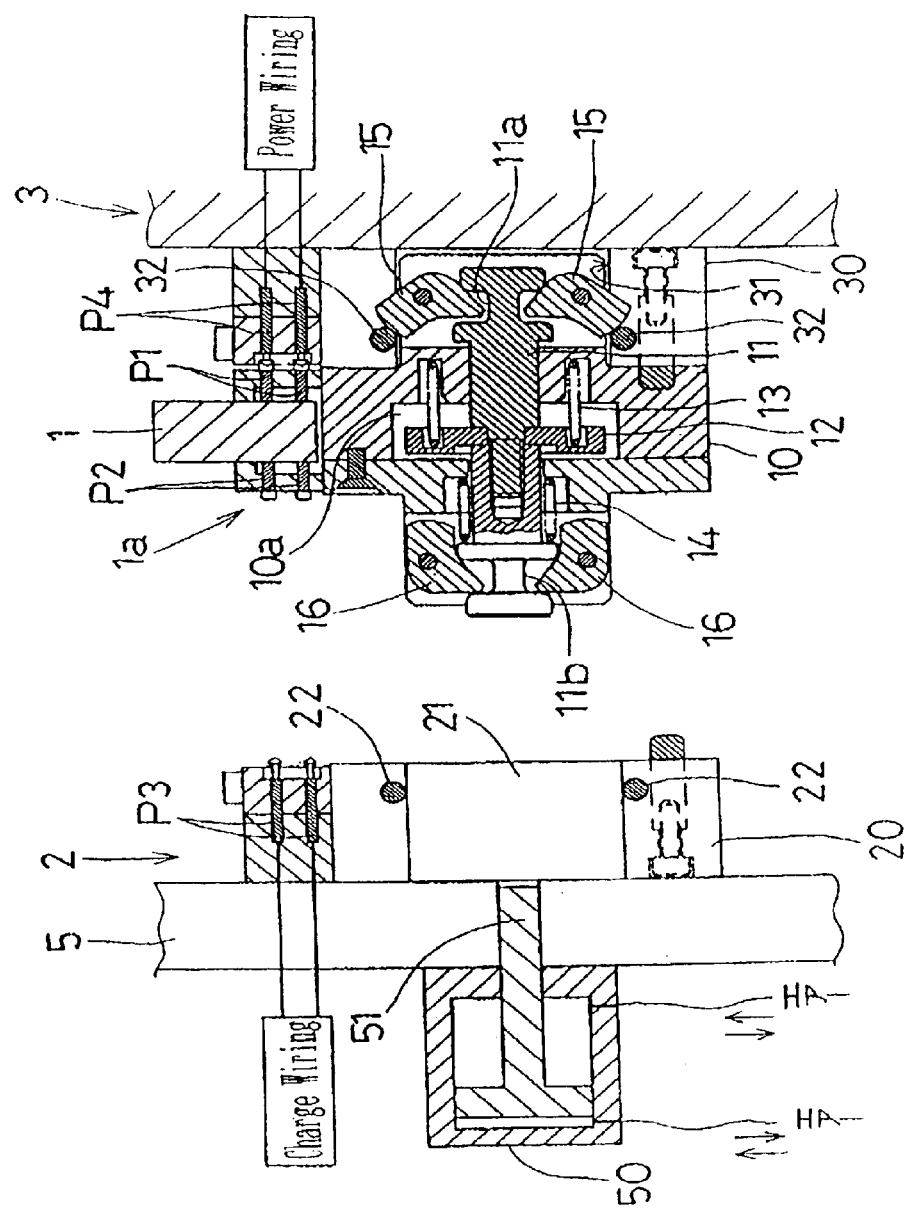
FIG. 2 is a sectional view showing the relation between an automatic switch mechanism and a holding member on a tool side when a storage cell is in use.

Referring to FIG. 2 showing one storage cell 1, the storage cell 1 has first contact pins P1 and P1 for electrically connecting with a power wiring, and second contact pins P2 and P2 for electrically connecting with a charge wiring The storage cell 1 is also provided with the foregoing automatic switch mechanism 1a. As shown in FIG. 2, the automatic switch mechanism 1a includes a body member 10, an axial member 11, a plate member 12, a first and a second spring 13 and 14, and first and second engaging cam plates 15 and 16. The body member 10 has a hollow 10a in the center. The axial member 11 moves back and forth (in the right and left directions) through the body member 10 and is provided with a first and a second circumferential groove 11a and 11b at its both longitudinal ends. The plate member 12 is disposed in the center of the hollow 10a and housed therein. The first spring 13 presses the plate member 12 to the left side and the second spring 14 presses the axial member It to the left side. The first and the second engaging cam plates 15 and 16 are provided rotatably at both of the end portions of the body member 10 and pointed portions thereof are respectively received in the first and the second circumferential groove 11a and 11b.

Referring to FIG. 2 showing one of the charges 2. The charger 2 includes a holding member 20, which has a space 21 for receiving the left-end portion of the automatic switch mechanism 1a and first engaging pins 22 which engage with or disengage from the second engaging cam plates 16 and 16. The charger 2 further includes third contact pins P3 and P3, which electrically connect with the charge wiring.

Although the application or usage of the tool 3 is not specified here, the tool 3, as shown in FIGS. 1 and 2, includes for example a sensor 3a, an actuator 3b, and a wireless communication means 3c, and further a second holding member 30 which holds the storage cell 1 and its automatic switch mechanism 1a provided thereon.

The second holding member 30 has the same construction as the first holding member 20. As shown in FIG. 2, the second holding member 30 includes a second space 31 which receives the right-end portion of the automatic switch mechanism 1a, and second engaging pins 32 which engage with or disengage from the foregoing first engaging cam plates 15 and 15. The second holding member 30 further includes fourth contact pins P4 and P4 which electrically connect with the power wiring.

Signals such as verification signals of the sensor 3a and operation signals to the actuator 3b from the robot control panel 4 are transmitted by exchanging wireless signals between the wireless communication means 3c and the robot control panel 4.

The charge panel 5, as shown in FIG. 2, is provided with an air cylinder 50 which has an output shaft 51 and causes it to move out or in the panel 5, so as to transfer the storage cell 1 from the tool 3 side to the charger 2 side and vice versa with the automatic switch mechanism 1a.

How storage cells 1 are transferred from the tool 3 side to the charger ? side and vice versa will be described below, Here is specifically described the manner in which, with the automatic switch mechanism 1a, firstly a first storage cell 1 on the tool 3 side is transferred to the charger 2 side and then a second storage cell 1 on the charger 2 side is transferred to the tool 3 side.

First of all, the transfer of the first storage cell 1 in need of charge front the tool 3 side to the charger 2 side will be described.

(1) The State in FIG. 2

In this state, the first storage cell 1 is on the tool 3 side, Here, the axial member 11 is shifted to a leftmost position by the pressure of the first and second springs 13 and 14, and the first engaging cam plates 15 and 15 engaging with the axial member 11 are engaged with the second engaging pins 32 and 32. Hence, the first storage cell 1 is reliably fixed to the tool 3.

In this state, the first storage cell 1 and the power wiring are electrically connected with each other through the contact between the first contact pins P1 and P1 and the fourth contact pins P4 and P4. The first storage cell 1 powers the actuator 3b and the sensor 3a.

Figure 3:
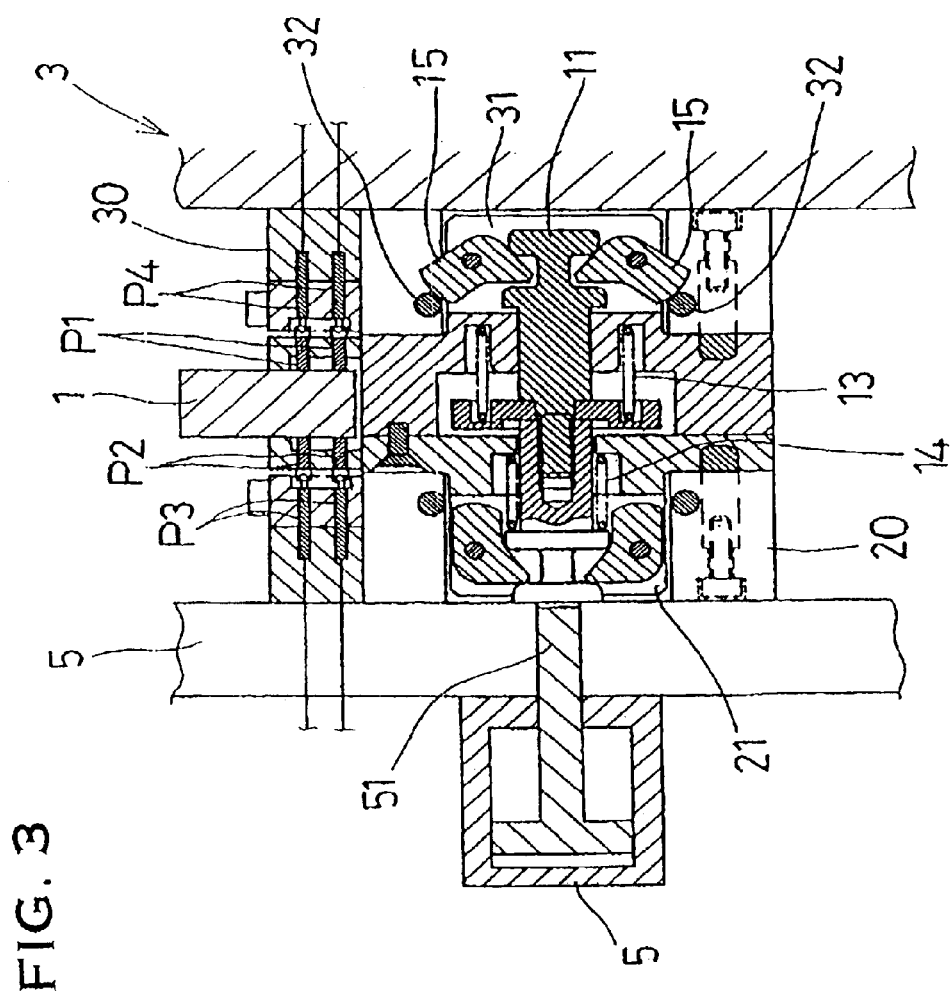
FIG. 3 is a sectional view showing a state where the left-end portion of the automatic switch mechanism is inserted into a space of a holding member on a charger side.

(2) The State in FIG. 3

In this state, the left-end portion of the automatic switch mechanism 1a is inserted into the first space 21. Here, the first storage cell 1 is ready to be connected with the charger 2, and the first engaging cam plates 15 and 15 still remain in the engaging state with the second engaging pins 32 and 32. In other words, the first storage cell 1 is still reliably fixed on the tool 3 side.

Figure 4:
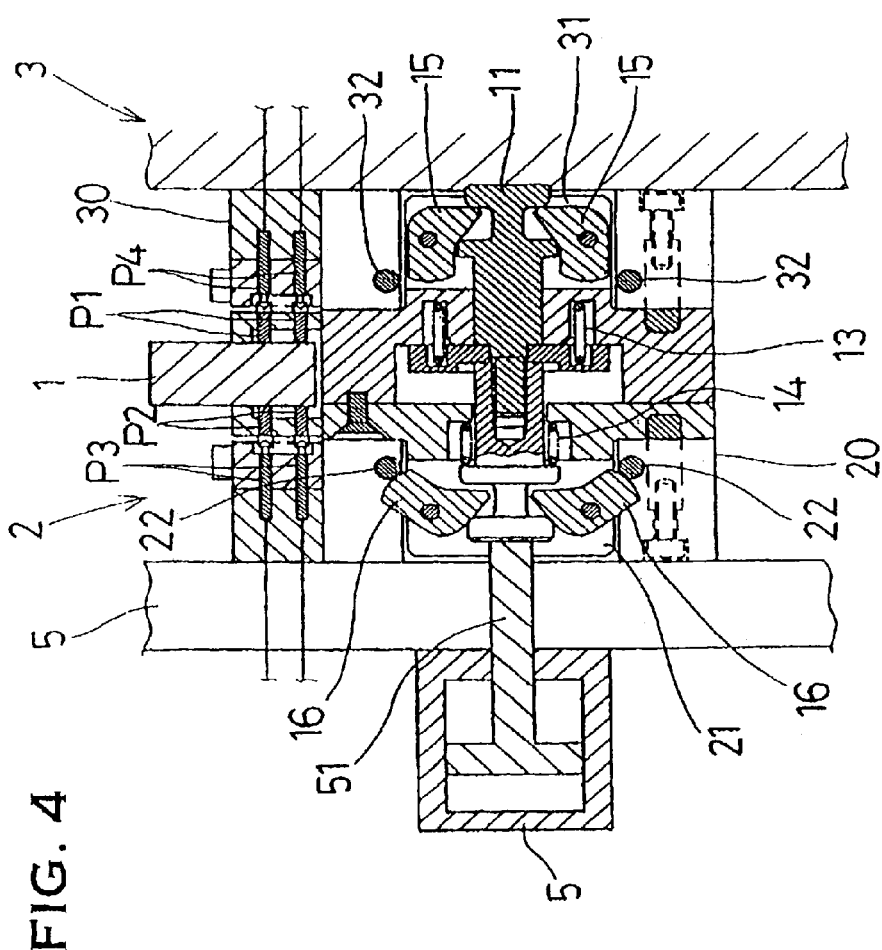
FIG. 4 is a sectional view showing a state where the automatic switch mechanism of the storage cell is attached on the charger side.

(3) The State in FIG. 4

In this state, the first storage cell 1 is connected to the charger 2 side. Here, the axial member 11 is shifted to a rightmost position by being pressed by the output shaft 51. The first engaging cam plates 15 and 15 engaging with the axial member 11 come to be In a disengaged state from the second engaging pins 32 and 32, while the second engaging cam plates 16 and 16 fall in an engaging state with the first engaging pins 22 and 22. Consequently, the first storage cell 1 is firmly attached to the charger 2 side.

Figure 5:
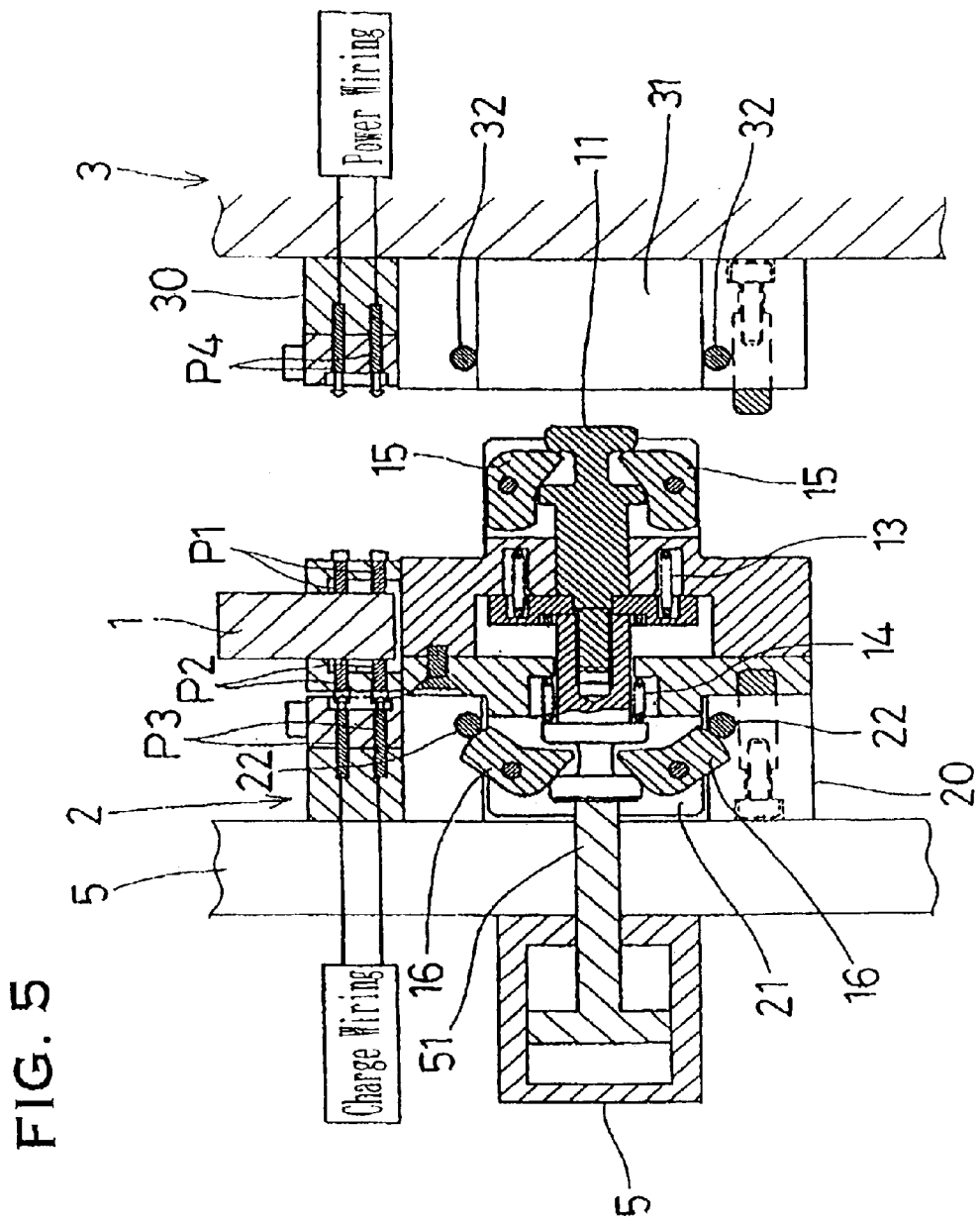
FIG. 5 is a sectional view showing a state where the tool is separated from the state shown in FIG. 4.

(4) The State in FIG. 5

In this state, the tool 3 is away from the charger 2 side. When the tool 3 in the (state (3) separates from the charger 2 side, the first storage cell 1 comes off from the tool 3 and stays on the second charger 2.

In this state, the storage cell 1 and the charge wiring are electrically connected with each other through the contact between the second contact pins P2 and P2 and the third contact pins P3 and P3, and the first storage cell 1 starts to be charged.

Next, the manner in which the second storage cell 1 attached on the charger 2 side is transferred to the tool 3 side is described.

(5) Transfer of the Second Storage Cell (FIGS. 4 and 5)

The tool 3 approaches to the right-end portion of a second automatic switch mechanism 1a fixed on the second charger 2 and receives it into the second space 31 of the holding member 30 of the tool 3. Here, the description is made again referring to FIGS. 4 and 5. The output shaft 50 of the cylinder 5 moves backward, the axial member 11 is shifted leftwards by the pressure of the first and second springs 13 and 14. Subsequently, the first engaging cam plates 15 and 15 fall in an engaging state with the second engaging pins 32 and 32 whereas the second engaging cam plates 16 and 16 does in a disengaged state from the first engaging pins 22 and 22 (see FIG. 3).

Consequently, the second storage cell 1 is firmly attached on the tool 3 side.

Here, when the tool 3 is separated away from the second charger 2, the second storage cell 1 comes off from the second charger 2 and shifts to the tool 3 and remains thereon.

(6) With the Above Steps (1) to (5), this Robot System Facilitates Easy and Quick Switch of Storage Cells 1

Being constructed as stated above, the robot system according to the present invention has no cable running between the control panel 4 and the tool 3. Therefore the robot system has less limited range of the robot movement, while is unlikely to cause a stop of the production and/or operation line.

Although the above first embodiment uses two storage cells 1 and two chargers 2, this is not limitative, and the system may have more than two storage cells and charges. In this case, two storage cells 1 may be mounted on the tool 3.

What is claimed is:

1. A robot system in which various pieces of information are exchanged between a tool on a wrist of a robot and a control panel by wireless communication, comprising:

plural storage cells for supplying the tool with power including information communication;

plural chargers for charging the plural storage cells;

an automatic switch mechanism provided on each of the plural storage cells which transfers an associated storage cell from the tool to one of the chargers and vice versa; and wherein, when a first of the storage cells being placed on the tool runs out of power, the first storage cell is returned to a first vacant charger out of the plural chargers to be charged and a second of the storage cells having being charged on a second of the plural charges is received on the tool.

2. A robot system according to claim 1, wherein when being on the tool, the storage cells are electrically connected with a power wiring, while when being on the chargers, the storage cells are electrically connected with a charge wiring.

* * * * *